Feb. 14, 1939. A. J. SCHOLTES 2,147,356
CONTRACTED SLEEVE HOSE COUPLING
Filed July 15, 1938   2 Sheets-Sheet 1
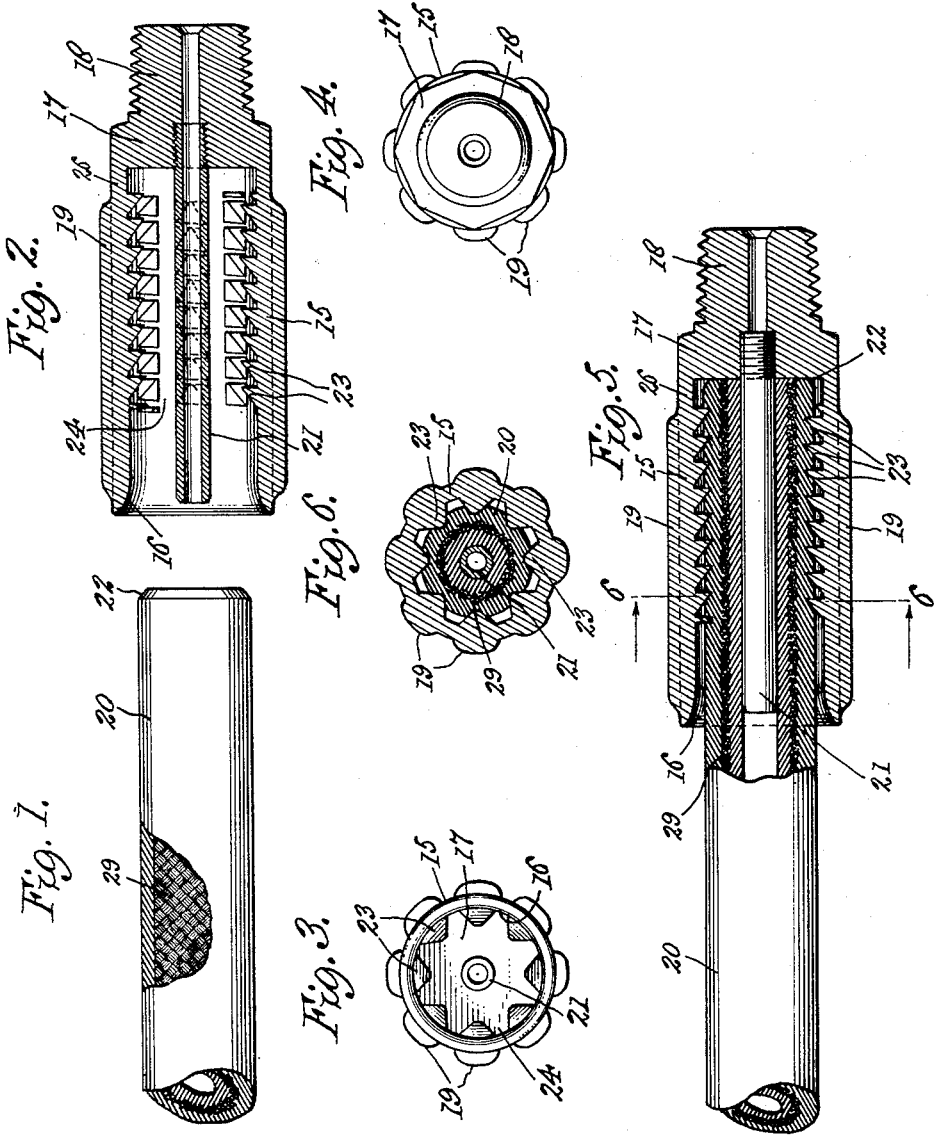
Inventor
Albert J. Scholtes
By Mawhinney & Mawhinney
Attorneys.

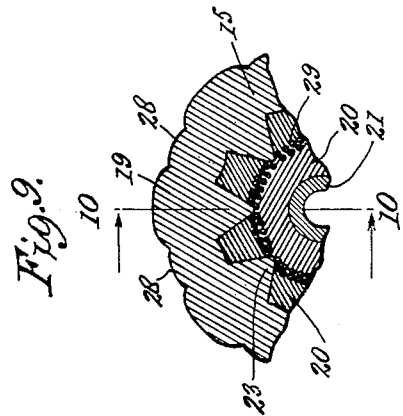
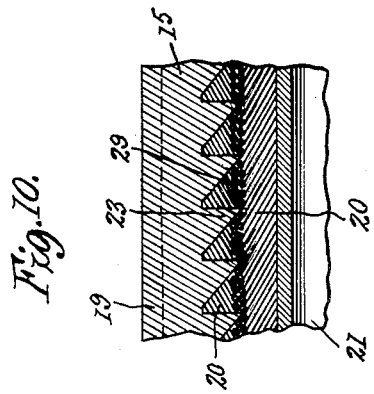
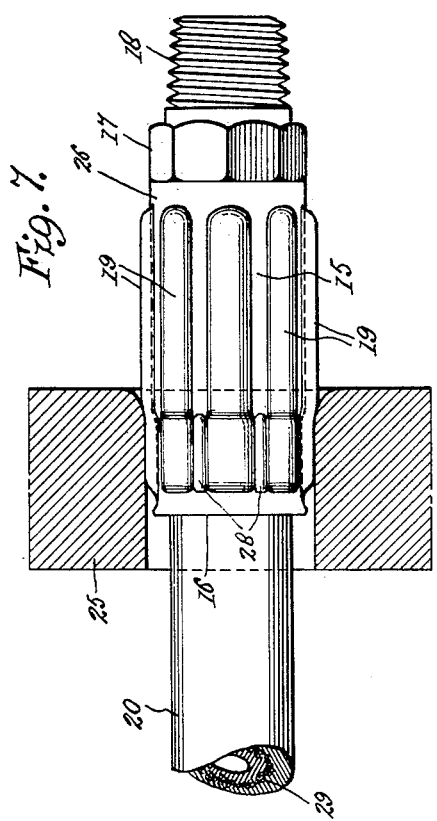
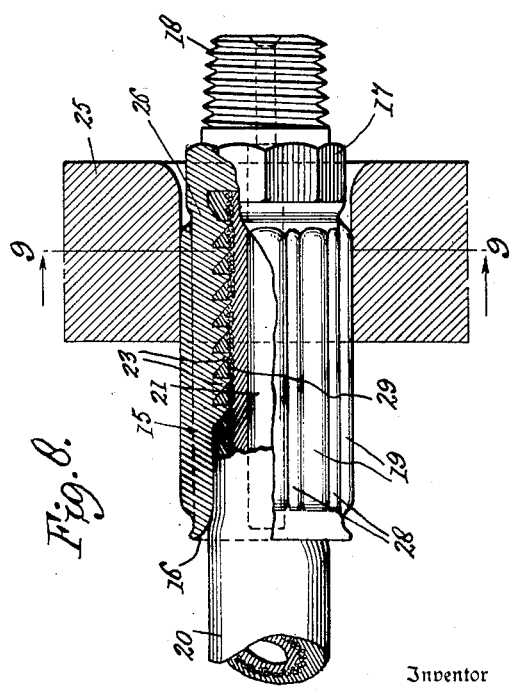

Patented Feb. 14, 1939

2,147,356

UNITED STATES PATENT OFFICE 2,147,356

CONTRACTED SLEEVE HOSE COUPLING

Albert J. Scholtes, Baltimore, Md.

Application July 15, 1938, Serial No. 219,451

6 Claims. (Cl. 285—77)

The present invention relates to hose couplings of the permanent character, and more particularly to hose couplings which are closed or secured together by compression and permanent contraction of the outer or sleeve portion of the coupling.

An object of this invention is to provide a hose coupling capable of withstanding high pressures, and in which the coupling sleeve not only is contracted upon the end of the hose to effect frictional engagement therewith, but also is positively interlocked with the hose by means of teeth interfitting between the crossed braid of the wire reinforcement of the hose.

This invention is a companion to the invention disclosed in applicant's copending application Serial No. 211,923 filed June 4, 1938, differing therefrom in that the present invention permanently holds the teeth in the braid reinforcement of the hose as the coupling is of the permanent type, while in the prior application the invention secures the teeth in interlocked relation in the braid reinforcement of the hose with a coupling which is of the wrench operated releasable type.

Another object of this invention is to provide a hose coupling embodying the above stated features, adaptable to hose having a braided wire reinforcement, wherein the compressible sleeve has teeth constructed and proportioned to penetrate only the outer braided layer, which do not cut or otherwise damage the outer braided layer but which engage in the meshes of the braid and lock in the angles formed by the crossed strands of the braid, and wherein is prevented any localized continuously circumferential and frictional contact with the wire braid, depending solely upon compression to hold the coupling member on the hose.

The invention also provides a compressible sleeve to fit over the end of a hose and which has spaced apart longitudinal ribs on its outer surface dividing the sleeves into a number of panel sections having substantially less wall thickness than the rib portions, and adapted to be compressed in a die, the reduced sleeve wall thickness between the ribs being compressed and slightly thickened during the reduction of the coupling sleeve, when being compressed in the die.

Another object of the invention is to provide a hose coupling with a sleeve of uniform bore adapted to receive the end of a hose without skiving or paring away a portion of the outer surface of the hose, and which has internal teeth arranged along its bore adapted, by the contraction of the sleeve, to penetrate the outer portion of the hose and to intersect and engage in the wire braiding of the hose. This object of the invention also embodies structural features at the outer surface portion of the sleeve to insure the substantially uniform contraction of the sleeve from end to end and the advancement of the teeth uniformly into the braided wire of the hose to grip and interlock with the latter throughout a substantial length of the hose and at the same time the smooth inside surface portion of the sleeve around the base of the teeth, compresses the outer portion of the hose, thus preventing the localizing of the gripping and interlocking action at any one point through the length of the sleeve.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a detail fragmentary side elevation, partly in section, of the end of a high pressure hose ready for insertion in the sleeve of the coupling.

Figure 2 is a longitudinal central section taken through the coupling member before contraction and ready to receive the hose end shown in Figure 1.

Figure 3 is a detail end elevation of the open end of the sleeve, showing the internal teeth.

Figure 4 is a detail opposite end elevation showing the intermediate nut portion of the sleeve and the exterior longitudinal ribs.

Figure 5 is a longitudinal section taken through the coupling prior to contraction and showing the hose end threaded into the sleeve.

Figure 6 is a transverse section taken on the line 6—6 of Figure 5 showing the initial engagement of the teeth in the outer surface portion of the hose.

Figure 7 is a side elevation of the hose coupling being compressed and partly passed through the die.

Figure 8 is a similar view, partly in section, of the hose coupling fully compressed and passing through the die.

Figure 9 is a detail enlarged sectional view taken through the fully contracted coupling substantially on the line 9—9 of Figure 8, and Figure 10 is a fragmentary sectional view through the same taken substantially on the line 10—10 of Figure 9.

Referring now to the drawings, and first to Figures 1 and 2, the coupling comprises a sleeve 15 which is open at one end and slightly flared or rounded at its inner wall, as at 16, and which is closed at its opposite end by a nut portion 17 having outer surface wrench engaging faces of any desired number, the nut portion 17 being octagonal in the present instance. The nut portion 17 carries a coupling part 18 which may be in the form of an externally threaded stem or the like, depending upon the desired coupling to be made. The outer surface portion of the sleeve 15 has a plurality of longitudinal ribs 19 which are circumferentially spaced apart upon the outer wall of the sleeve and which may be of uniform height and throughout the length of the ribs 19 to divide the sleeve wall into a number of panels having intermediate thinner wall portions adapted for compression or deformation incident to the radially inward movement of the ribs 19 when the sleeve is compressed.

The sleeve 15 is of uniform internal bore substantially throughout its entire length and, as shown in Figures 5 and 6, first receives the hose end 20 somewhat loosely therein, the hose end being advanced into the sleeve and against the nut portion 17. A supporting tube 21 is carried by the nut portion 17 coaxially with the sleeve 15 and extends lengthwise through the sleeve to a point adjacent its open end 16. The tube 21 opens through the nut portion 17 of the coupling part 18 and is adapted to engage in the central opening of the hose 21 to establish and maintain free communication through the hose and the coupling. The tube 21 supports the hose against any possible collapsing incident to compression and is adapted to frictionally engage against the inner wall portion of the hose. The free end of the hose 20 may be slightly beveled or cut off as shown at 22, merely for the purpose of removing the slightly flared edge of the hose which is produced by cutting off the hose in desired lengths. The sleeve 15 is provided at its inner wall with inwardly extending teeth 23, and the teeth may be of any suitable type, preferably of the buttress type, as shown. The teeth, initially, are in the form of ridges, spaced apart around the inner wall of the sleeve 15, and having grooves or recesses 24 between the ridges, and are cut out of the ridges by spiral thread cutting of the ridges with either a right or a left hand thread. This facilitates the initial insertion and screwing in of the hose end 20 in assembling the coupling, as shown in Figure 5. The teeth 23 have their threaded relation interrupted by the cross grooves or recesses 24 which extend in any suitable angular relation lengthwise of the sleeve, and which in the present instance are shown as extending axially within the sleeve. These cross grooves or recesses 24 may be in any other formation than as shown providing they intersect the thread formation of the teeth 23 and thus divide or separate the teeth into independent elements for easy penetration through the outer surface portion of the hose 20.

As clearly shown in Figure 3 the cross grooves 24 may have substantially flat throats or inner faces which constitute the inner bore or circular inner wall of the sleeve 15 and the lateral faces of the slots or grooves 24 are flared inwardly toward the center of the sleeve to impart inclined edges or faces to the teeth 23. From Figure 2 it will be seen that the bottoms of the spiral grooves or threads defining the teeth 23 also comprise portions of the inner cylindrical wall of the sleeve 15 so that the bore of the sleeve is maintained uniform throughout substantially its entire length and around the teeth and thus the gripping action of the teeth 23 is uniform upon the hose 20 throughout the toothed portion of the sleeve. The smooth cylindrical bore of the sleeve 15 grips with a uniform pressure entirely about the hose end 20 throughout the length of the sleeve and has a surface area greater than that of the teeth 23.

As shown in Figure 5 the hose end 20 is first loosely screwed into the sleeve, the teeth 23 engaging into the outer surface portion of the hose to a slight extent, sufficient for advancing the hose 20 into the sleeve by a turning or screwing action relatively between the sleeve 15 and the hose 20. When thus assembled, as shown in Figure 5, the coupling is then passed through a die 25, shown in Figure 7, which contracts the sleeve 15 by engaging the outer surface portions of the ribs 19. The ribs 19 extend throughout the major portion of the length of the sleeve but terminate short of the opposite ends of the sleeve so that there is left the flaring or mouth portion 16 at the open end of the sleeve which is unsupported by the ribs 19 and which, as shown particularly in Figure 2, is initially of less exterior diameter than that defined by the outer portions of the ribs 19. The opposite or inner ends of the ribs 19 terminate in spaced relation from the nut portion 17 so as to provide a bendable sleeve wall portion 26 which, as shown in Figure 8, is capable of being bent, compressed or otherwise deformed inwardly to follow the direction of the sleeve wall when contracted. By further passing the sleeve 15 through the die 25 from the initial flange shown in Figure 7 to the final position shown in Figure 8, the die 25 completes the reduction of the sleeve and compresses the ribs 19 into substantially the outer surface portion of the sleeve while the intermediate wall portion 28 of the sleeve is deformed slightly during the reduction and is caused to be circumferentially compressed and to slightly bulge in opposite directions outwardly between the ribs 19 and inwardly between adjacent teeth 23, depending upon the amount of hose material which is compressed and crowded into the spaces between the teeth. As shown in Figure 9, particularly, the teeth 23 are disposed, preferably, radially opposite the ribs 19 so that the projecting ribs, which receive the true thrust of the die during compression, transmit the pressure directly to the alined teeth 23. This causes the teeth 23, in the operation of contraction through the die 25, to be driven directly into the wire mesh or braid reinforcement 29 of the hose 20 so that the inner edges of the teeth, which are preferably slightly rounded as shown, press into the braid reinforcement and interlock in the angles produced by the crossed strands of the braid; the hose end 20 thus being securely interlocked with teeth in the coupling and held from pulling out of the sleeve, not only by friction incident to contraction of the inner wall of the sleeve about the outer surface of the hose but also by the positive interlock between the braid and the apices of the teeth. In Figure 10 it will be noted that the entire line of teeth 23 are individually embedded and interlocked in the strands of the braid 29 so that there are a large number of independent gripping and interlocking teeth engaged directly with the wire reinforcement 29 of the hose throughout a substantial length of the sleeve and the outer surface portion of the hose is maintained compressed by the inner wall portions of the coupling for sealing the hose in the sleeve and for assisting in maintaining the teeth in interlocked engagement with the braided wire of the hose.

Preferably, as shown in Figures 2, 5 and 8, the outer and inner portions of the sleeve 15 may be left free of the teeth 23 so that the inner smooth bore portion of the sleeve may frictionally engage and grip with the outer surface portion of the hose 20, and the hose itself will be maintained against cutting and breakage at or about the open end of the sleeve.

The completed coupling is shown in Figure 8, and it will be noted that the sleeve 15 is of substantially uniform wall thickness throughout its length and that the opposite ends only are not subjected to the true compression during the contraction of the sleeve on the hose. Consequently the sleeve thrusts its major portion grip uniformly upon the embraced length of hose and all of the teeth are embedded uniformly in the braided wire portion of the hose and over a considerable length of the hose. The coupling as shown in Figure 8 avoids any localized compression of the hose within the sleeve as the compression is uniform and the interlocking takes place at a large number of independent points, at the teeth 23, not only lengthwise of the hose but also at various points about its outer surface.

While the hose 20 has been described as having a wire braid reinforcement 29 it is understood that any adaptable type of hose may be used and any practical construction or type of reinforcement may be used, the wire reinforced hose being shown merely by way of example in detailing one embodiment of the invention.

While the teeth 23 are shown in spiral or thread like rows in the contracting sleeve 15, it is of course understood that the rows of teeth 23 may be disposed in any other suitable manner, and the form of tooth 23 is shown as of the buttress type but may be varied to suit conditions of use and manufacture.

What is claimed is:

1. A sleeve for a hose coupling adapted to be contracted, comprising a cylindrical body having a substantially uniform inner wall surface portion, said cylindrical body having circumferentially spaced apart teeth integral with and projecting inwardly from said inner wall surface portion, said cylindrical body when contracted adapted to advance said teeth radially inward toward the axis of the sleeve.

2. In a contracted sleeve hose coupling, a hose end having a wire braid reinforcement therein, a clamping sleeve contracted about the hose end and having a substantially uniform bore to exert substantially uniform compression upon the outer portion of the hose and throughout the length of the sleeve, said sleeve having at least one spiral row of circumferentially spaced apart teeth projecting from the inner wall of the bore of the sleeve throughout a substantial length thereof and penetrating the outer surface portion of the hose end and interlocking with the wire braid reinforcement for compressing and interlocking the hose end in the sleeve uniformly throughout a substantial length of the sleeve.

3. A permanent hose coupling comprising a sleeve having a single bore with at least one spiral row of circumferentially spaced apart teeth projecting from the wall of the bore, and a hose end of substantially uniform thickness engaging in the sleeve and in engagement with said teeth, said sleeve having external longitudinal ribs spaced apart on its outer surface portion and adapted to be forced inwardly and uniformly throughout their lengths for contracting the sleeve upon the hose end, said teeth when the sleeve is contracted interlocking with the reinforcing braid in the hose and interlocking the same in the sleeve.

4. In a permanent hose coupling, a sleeve adapted to be contracted upon the end of a hose having a wire braid reinforcement, said sleeve before contraction having outer surface longitudinal ribs spaced about the sleeve and defining wall panels with deformable wall portions between the ribs, said sleeve having circumferentially spaced apart rows of teeth projecting from the bore thereof in line with said ribs, said wall panels of the sleeve adapted to be compressed about the hose end when the sleeve is contracted and said teeth adapted to penetrate the outer surface portion of the hose and into interlocking engagement with the wire braid reinforcement of the hose, the wall portions between said ribs adapted to conform to the contraction and to the outer surface portion of the hose for sealing the latter in the sleeve and maintaining a uniform gripping action on the hose end throughout the length of the sleeve.

5. In a permanent hose coupling, a sleeve adapted to be contracted upon the end of a hose, said sleeve having a substantially uniform bore and having substantially longitudinal external ribs spaced apart about the sleeve and providing panel and intermediate deformable wall sections, said ribs when the sleeve is contracted adapted to be uniformly compressed against the hose end, thereby deforming the hose material outwardly against said intermediate wall sections.

6. In a permanent hose coupling, a sleeve adapted to be contracted about the end of a hose having a wire braid reinforcement and having a single bore of substantially uniform diameter, said sleeve having longitudinally and circumferentially spaced apart teeth projecting from the wall of said bore, said sleeve when contracted adapted to uniformly embrace the outer surface portion of the hose end and said teeth adapted to uniformly penetrate the outer surface portion of the hose end and independently interlock with said wire braid reinforcement.

ALBERT J. SCHOLTES.